Nov. 17, 1959 W. H. WILKES 2,912,724
INTERIOR FINISH FOR AIRCRAFT CABINS OR THE LIKE
Filed July 16, 1956 3 Sheets-Sheet 1
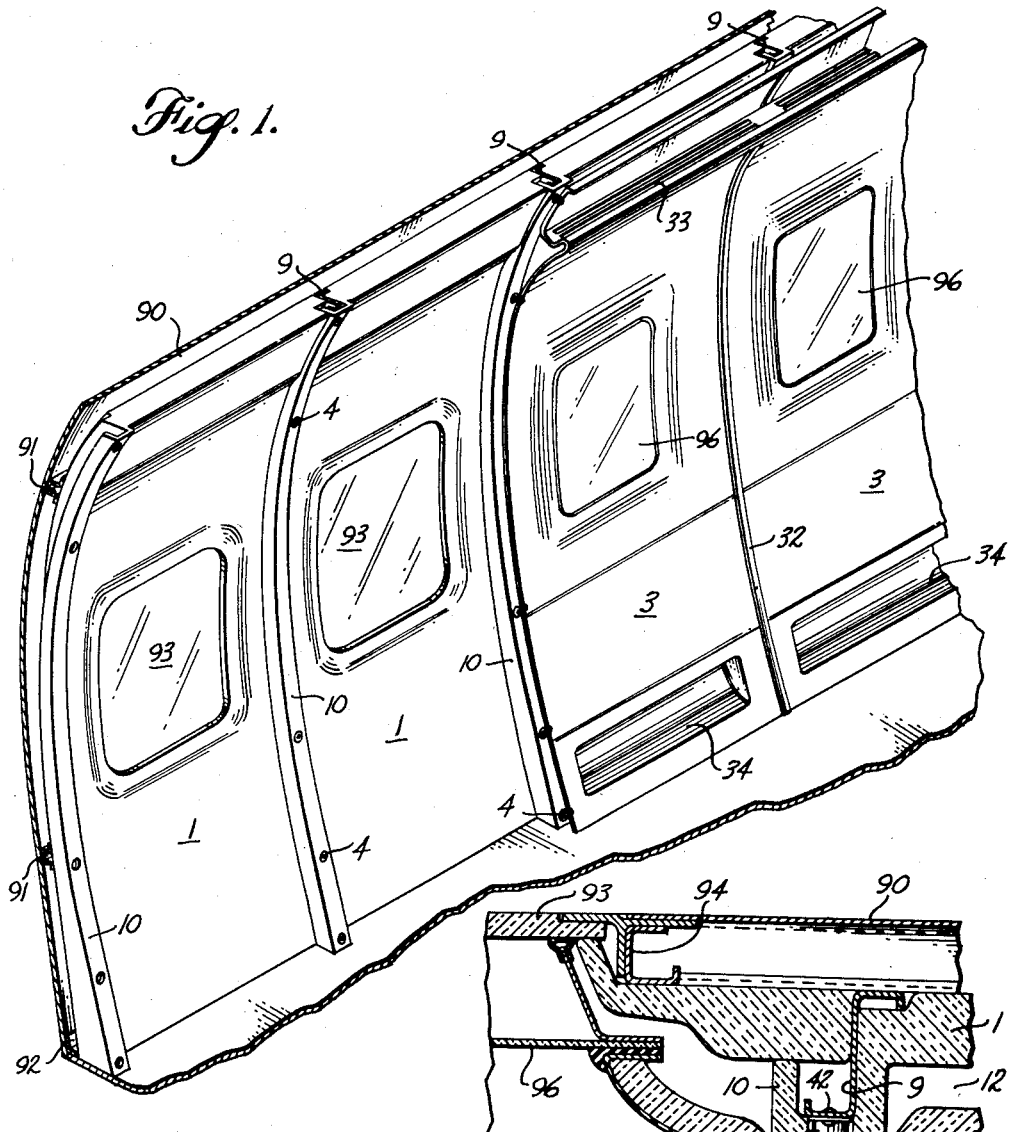
INVENTOR.
WESLEY H. WILKES
BY
Reynolds, Beach
+ Christensen
ATTORNEYS

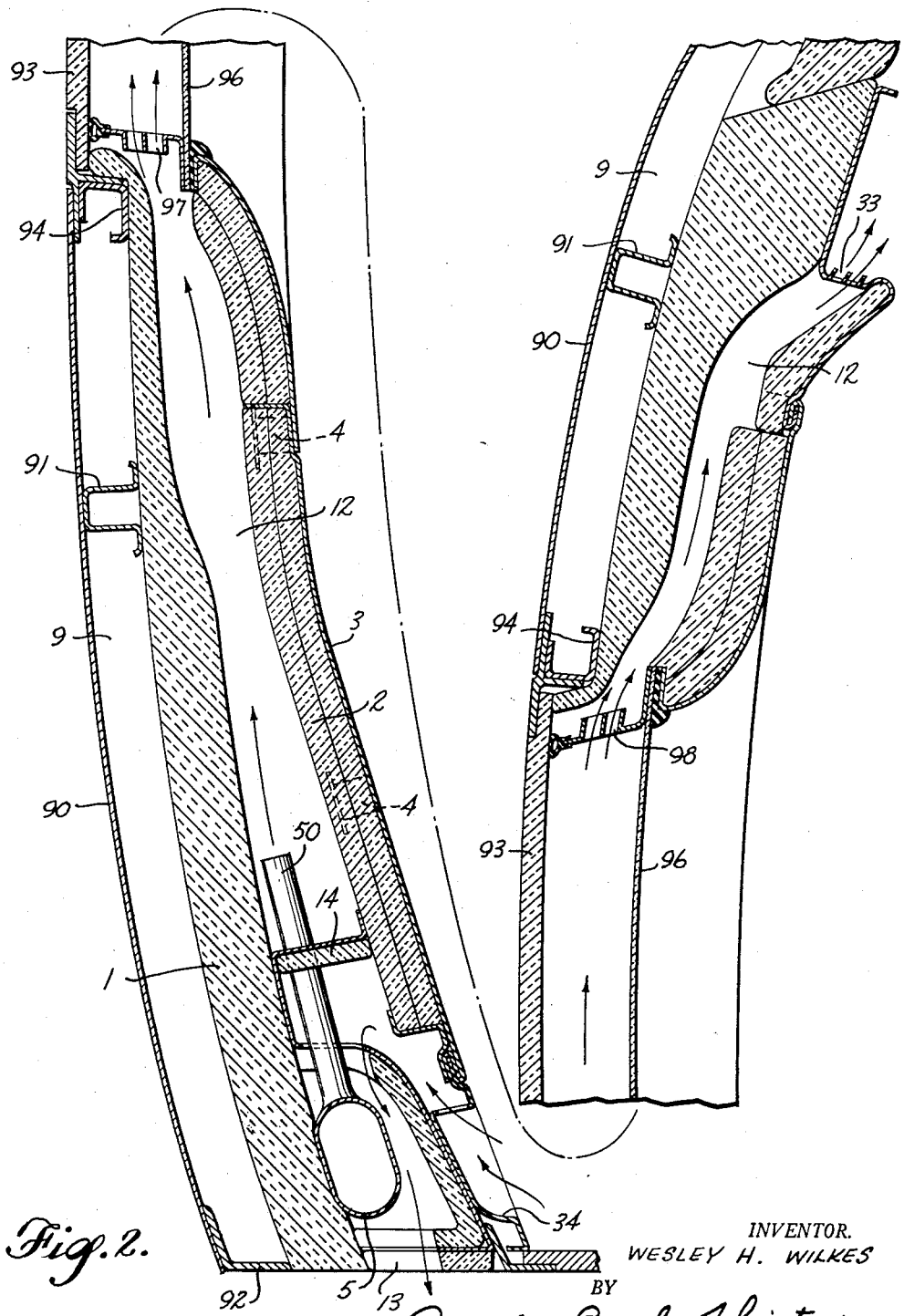

Nov. 17, 1959 W. H. WILKES 2,912,724
INTERIOR FINISH FOR AIRCRAFT CABINS OR THE LIKE
Filed July 16, 1956 3 Sheets-Sheet 3
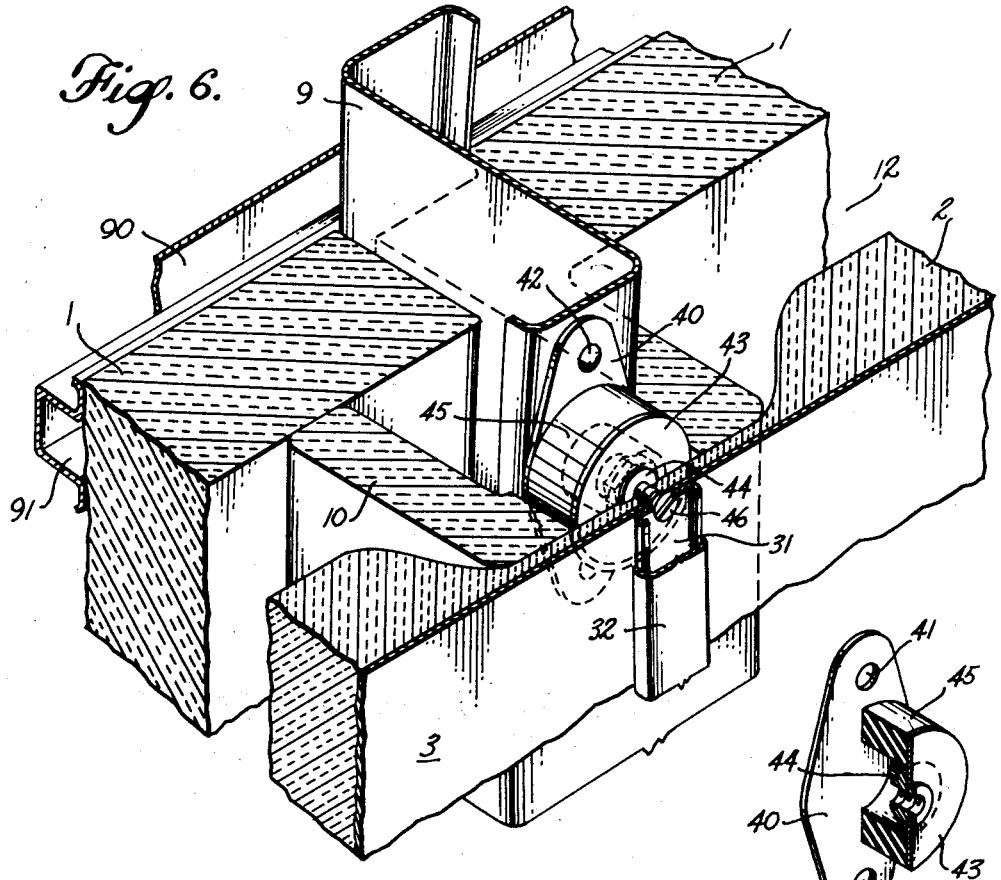
Fig. 6.
Fig. 7.
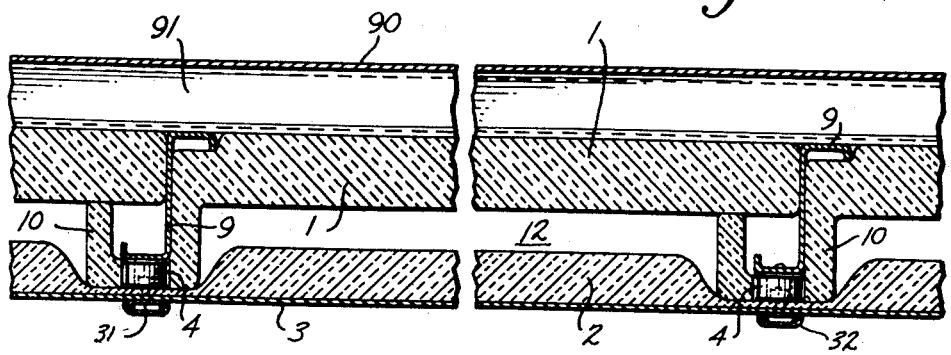
Fig. 3.
INVENTOR.
WESLEY H. WILKES
BY
Reynolds, Beach & Christensen
ATTORNEYS

United States Patent Office 2,912,724
Patented Nov. 17, 1959

2,912,724

INTERIOR FINISH FOR AIRCRAFT CABINS OR THE LIKE

Wesley H. Wilkes, Seattle, Wash., assignor to Boeing Airplane Company, Seattle, Wash., a corporation of Delaware Application July 16, 1956, Serial No. 598,063

4 Claims. (Cl. 20—4)

Soundproofing, in particular, and heat insulation, of aircraft cabins have long been practiced, and are important to the comfort of the passengers. It is particularly desirable in large cabins that the interior finish incorporate such insulating material in a form which is readily removed and replaced, in any local area, so that in case of need access may be had at any location to wiring, ducts, and the like, such as are incorporated in the space between the exterior skin of the cabin and the interior finish wall, without removing large areas of the interior wall. It should, too, be inherently form-sustaining, so that it requires no fitting when being replaced. In addition, it is sometimes desirable to eliminate actual ducts and to provide a space between outer and inner insulating panels, as installed, which may serve as duct space, or which, in other instances, may simply serve as dead-air insulating space. Above all, it is desirable that the insulating material be installed in a manner that will deaden or virtually eliminate the transmission of vibration or other sound-creating movement, as between the exterior skin of the cabin and the interior finish wall, yet will provide an adequately strong and secure support for the interior finish, free from unsightly and self-evident supports.

The present invention has for its object the accomplishment of the ends indicated above, and in addition the installation of insulating material in a manner to cooperate with windows or doors and their frames, ventilating ducts and registers, and the like.

The features which constitute the present invention are illustrated in a preferred form in the accompanying drawings, and will be more fully understood as this specification progresses, while the features which constitute this invention are set forth in the appended claims.

Figure 1 is an isolated isometric view of a cabin wall and skin construction, looking from within an airplane cabin, but showing only a portion of the finish wall as installed, and at another portion wherein the finish wall is yet to be installed.

Figure 2 is a vertical sectional view through such a cabin wall and the exterior skin, and through a window in such a wall, and illustrating certain ducts formed within the wall, intermediate the outer skin and the interior finish wall, according to the present invention.

Figure 3 is a horizontal sectional view through such a wall.

Figure 4 is a horizontal sectional view through the wall at one edge of a window, and Figure 5 is a similar view through the wall at the opposite edge of a window.

Figure 6 is an enlarged isometric view, in section through the wall construction, of a detail of the isolating mount used for the support of the interior wall panels.

Figure 7 is a cut-away isometric view of an individual isolating mount.

The aircraft cabin structure will incorporate an exterior skin 90, supported on framing elements such as will include the vertically directed curved ribs 9 and longerons 91, 92, etc. Window glasses 93 are installed at intervals, in association with framing elements 94, as shown in other views. Such details of the airplane cabin construction are known, and are not themselves part of this invention, but it is necessary to refer to them in order to understand how the interior finish of this invention cooperates therewith.

Adjacent the inner surface of the exterior skin 90 is a layer of insulating material, indicated at 1. Preferably this is molded into self-sustaining form, suitably contoured to conform to the skin contour between the framing elements, but the contour is of a special nature. Referring, for instance, to Figure 3, the insulating wall panel 1, which may be for example of molded Fiberglas, is of a shape and size to cover the exterior skin between successive framing elements 9, and to overlie or hook over the framing element 9 at its one edge, and to edge-abut such framing element 9 at its opposite edge. Thus, each such framing element is embraced and wholly shrouded by portions of the insulating panels 1 and in the aggregate the entire exterior structure is so shrouded.

Preferably, sole reliance for insulation is not placed on the outer insulating panels 1, but in addition inner insulating panels 2 are employed, which overlie and are preferably spaced somewhat from the outer insulating panels 1. Each such inner insulating panel 2 may, like the outer insulating panel 1, be molded to the proper shape or contour, and so be self-sustaining to conform to the contour of the aircraft cabin, or the inner insulating panel 2 may alternatively be self-sustaining but supported from and bonded to an interior finish wall panel 3. The panel 3 may be, for example, a sheet of metal or a sheet of plastic, to the interior surface of which is bonded a finish material such, for instance, as a cloth. It is shown herein as a simple sheet metal panel.

In order to support the insulating panels 1 and 2 in their installed positions, and to support the interior wall panel 3, and yet to eliminate transmission of vibrations of sound and of temperature between the skin 90 and the interior wall panel 3, there are used a plurality of isolating mounts, of the general nature best shown in Figures 6 and 7, and generally designated by the numeral 4, and such as will now be described in detail.

These isolating mounts 4 comprise primarily a hollow cylinder or block 45 of resilient matter such, for example, as rubber or rubber composition or bundled wire mesh, for interposition between the exterior skin, or parts connected thereto, and the interior wall panel 3. For example, a base 40 is bonded to one end of the block 45, and is provided with holes 41 by means of which rivets 42 may secure the base 40 to a framing element 9. At the opposite end of the rubber block 45, a receiver 43 is bonded, this consisting, for instance, of a simple disk or washer of metal, to which is secured a means for receiving a complemental securing element projecting inwardly from the interior wall panel 3. This receiver, indicated by the numeral 44, may conveniently take the form of a nut or some form of quick-disconnect fastener, whereby a headed screw or complemental fastener element 46 passing from the interior through a hole in the interior wall panel 3 may be received within the receiver 44 and, bearing with its head against the wall panel 3, will secure the latter in place. The hook 10 of the outer insulating panel 1 is apertured for the passage through it of each isolating mount, and the inner insulating panel 2 is preferably interposed between the washer 43 and the interior wall panel 3 to prevent transmission of sound and vibrations. A sufficient number of these isolating mounts are distributed about the cabin interior, and in this manner, by a wholly simple arrangement, the outer and inner insulating panels 1 and 2 are all supported in place, together with the interior wall panels 3. Whenever required, the screws 46 may be removed from their receiving nuts 44, and the interior finish or any single panel or panels thereof may be dismantled.

For the sake of appearance, to eliminate the possibility of contact of passenger's clothing with the screw heads, and to add some strength at points of localized stress, it is desirable that the interior wall panel 3, along the lines of the isolating mounts 4, be provided with a strip 31 (see Figure 6) through which the screws 46 pass, and when all the screws along the strip 31 have been installed, a finish strip 32 may be installed over the strip 3, and the strip 32 then hides the screw heads.

The windows in aircraft of the general type described are generally double, and have an interior glass 96, spaced from the stronger exterior glass 93. The space between the two should be ventilated to prevent fogging up. In addition, ventilating air is admitted to the cabin and is removed therefrom. The spaces 12 between the outer and inner insulating panels 1 and 2 respectively, which in any event constitute air spaces, can serve well as ducts for directing such air. For instance, as best shown in Figure 2, a duct 5 installed between the skin 90 and the interior wall panel 3 leads in fresh air, and directs it by the nozzle 50 through a divider partition 14 into the space 12, whereby it may be lead to inlets 97 to the space between the window glasses 93 and 96, and it exists at 98 at the top of that space, where it again enters the space 12, and exits to the cabin interior at louvres 33 in a special panel of the interior finish wall. Air is removed from the cabin interior by the register 34 in an opening especially formed at the bottom of the interior wall panel 3 and in the inner insulating panel 2, and is lead out at 13. Communication between the spaces 12 and 13 is cut off by the divider partition 14.

Around windows, doorways, and at similar places the insulating panels 1 and 2 will have to be specially contoured, as is indicated, for instance, in Figures 4 and 5, and in Figure 2. It would be impossible to describe all the various special ways in which these are contoured, but throughout, so far as is possible, the principle is followed of supporting the panels only by means of the isolating mounts 4, and of maintaining an insulating space between the outer insulating panels 1 and the inner insulating panels 2.

I claim as my invention:

1. Interior finish for application to and removal from an aircraft cabin structure such as includes an exterior skin and framing elements projecting inwardly therefrom at spaced intervals, said finish comprising spaced exterior and interior panels, the exterior panels being of form-sustaining insulating material, of a size, shape and contour to conform to the interior of the skin, and to abut at one edge a given framing element and to extend at its opposite edge beyond a distant framing element, a hook formed on such opposite edge of the exterior panels, to encompass the distant framing element and to abut at its tip the surface of the next panel, to retain the latter in place, the interior panels overlying and spaced from the surface of the exterior panels, but resting upon the hooks thereof, mounting elements for securement at intervals upon and projecting from the framing elements, the exterior panels being apertured for the protrusion of said mounting elements, and means removably supporting said interior panels from said mounting elements.

2. Interior finish as in claim 1, the mounting elements including a bracket for securement to its framing element, a separate receiver, and a resilient element secured to each of and separating the bracket and receiver, and the interior panel supporting means being engageable only with said receiver, the apertures in the interior panel through which the mounting elements protrude being of a size to closely surround the latter.

3. Interior finish as in claim 1, wherein the interior panels are also of form-sustaining insulating material, of a contour to define the interior contour of the aircraft cabin.

4. Interior finish as in claim 1, including inlet means for air admitting to the space between the exterior and interior panels, and outlet means distant from said inlet means for discharging such air.

References Cited in the file of this patent

UNITED STATES PATENTS

| | | |
|---|---|---|
| 2,014,466 | Cheyney | Sept. 17, 1935 |
| 2,118,998 | Alnutt | May 31, 1938 |
| 2,138,176 | Keys | Nov. 29, 1938 |
| 2,263,919 | Darragh | Nov. 25, 1941 |
| 2,268,517 | Small | Dec. 30, 1941 |
| 2,553,881 | Suttles | May 22, 1951 |
| 2,681,716 | Black | June 22, 1954 |